(12) United States Patent
Moghtaderi et al.

(10) Patent No.: US 8,166,761 B2
(45) Date of Patent: May 1, 2012

(54) METHOD AND SYSTEM FOR GENERATING POWER FROM A HEAT SOURCE

(75) Inventors: Behdad Moghtaderi, New South Wales (AU); Elham Doroodchi, New South Wales (AU)

(73) Assignee: Newcastle Innovation Limited, New South Wales (AU)

( * ) Notice: Subject to any disclaimer, the term of this patent is extended or adjusted under 35 U.S.C. 154(b) by 574 days.

(21) Appl. No.: 12/227,340

(22) PCT Filed: May 14, 2007

(86) PCT No.: PCT/AU2007/000646
§ 371 (c)(1),
(2), (4) Date: Nov. 14, 2008

(87) PCT Pub. No.: WO2007/131281
PCT Pub. Date: Nov. 22, 2007

(65) Prior Publication Data
US 2009/0107144 A1 Apr. 30, 2009

(30) Foreign Application Priority Data
May 15, 2006 (AU) .................................. 2006902575

(51) Int. Cl.
*F01K 25/08* (2006.01)

(52) U.S. Cl. ................................ 60/651; 60/671; 60/682

(58) Field of Classification Search .................. 60/641.2, 60/641.8, 650, 651, 671, 682–683
See application file for complete search history.

(56) References Cited

U.S. PATENT DOCUMENTS
0,387,961 A 8/1888 Ryan
(Continued)

FOREIGN PATENT DOCUMENTS
GB 1398040 A 6/1975
(Continued)

OTHER PUBLICATIONS
"Rankine Cycle", Wikipedia, http://en.wikipedia.org/wiki/Rankine_cycle, downloaded Apr. 10, 2006.
(Continued)

*Primary Examiner* — Hoang M Nguyen
(74) *Attorney, Agent, or Firm* — Harness, Dickey & Pierce, P.L.C.

(57) ABSTRACT

A method of generating power from a heat source, said method including: compressing (10) a working fluid to increase its temperature; exchanging (11) heat between said working fluid and said heat source to superheat said working fluid; expanding (12) said superheated working fluid to drive a turbine, thereby reducing its temperature; condensing (13) said working fluid to further reduce its temperature: and returning said working fluid to said compressing step (10), the method further including the step (14) of regenerating the heat of said working fluid wherein working fluid passing between said compressing step (10) and said heat exchanging step (11) exchanges heat with working fluid passing between said expanding step (12) and said condensing step (13); wherein said steps are performed in a thermodynamic cycle (S1-S1'-S2-S3-S3'-S4) within a supercritical region (SC) above the saturation dome (A) of said working fluid, and wherein said heat regenerating step (14) is performed under isenthalpic conditions to induce continuous heat exchange. A system for generating power from a heat source is also provided.

50 Claims, 6 Drawing Sheets

U.S. PATENT DOCUMENTS

| | | | |
|---|---|---|---|
| 1,632,575 A | | 6/1927 | Abendroth |
| 2,882,687 A | * | 4/1959 | Stivender .................. 60/661 |
| 3,237,403 A | | 3/1966 | Feher |
| 3,875,749 A | | 4/1975 | Baciu |
| 3,956,899 A | * | 5/1976 | Kronogard ................ 60/682 |
| 4,183,220 A | * | 1/1980 | Shaw ........................ 60/682 |
| 4,228,654 A | * | 10/1980 | Hill ........................... 60/508 |
| 4,228,659 A | * | 10/1980 | Lowther .................... 60/682 |
| 4,357,802 A | | 11/1982 | Wahl, III et al. |
| 4,393,657 A | | 7/1983 | Takatama et al. |
| 4,982,568 A | | 1/1991 | Kalina |
| 6,230,480 B1 | | 5/2001 | Rollins, III |
| 6,606,848 B1 | | 8/2003 | Rollins, III |
| 6,751,959 B1 | | 6/2004 | McClanahan et al. |

FOREIGN PATENT DOCUMENTS

| | | |
|---|---|---|
| RU | 2125171 C1 | 1/1999 |
| RU | 2248453 C2 | 3/2005 |
| RU | 2273742 C1 | 4/2006 |
| SU | 300722 A1 | 6/1971 |

OTHER PUBLICATIONS

Barbier, Enrico, "Geothermal Energy Technology and Current Status: an Overview", Renewable and Sustainable Energy Reviews 6 (2002) 3-65.

Bertani, Ruggero, "World Geothermal Power Generation in the Period 2001-2005", Geothermics 34 (2005) 651-690.

DiPippo, Ronald, "Second Law Assessment of Binary Plants Generating Power from Low-Temperature Geothermal Fluids", Geothermics 33 (2004) 565-586.

Gu, Zhaolin and Sato, Haruki, "Optimization of Cyclic Parameters of a Supercritical Cycle for Geothermal Power Generation", Energy Conversion and Management 42 (2001) 1409-1416.

Gu, Zhaolin and Sato, Haruki, "Performance of Supercritical Cycles for Geothermal Binary Design", Energy Conversion and Management 43 (2002) 961-971.

Heppenstall, T., "Advanced Gas Turbine Cycles for Power Generation: A Critical Review", Applied Thermal Engineering 18 (1998) 837-846.

Hulen, J B and Wright, P M, "Geothermal Energy—Clean Sustainable Energy for the Benefit of Humanity and the Environment", Apr. 2001 brochure produced by the Energy & Geoscience Institute at the University of Utah.

Ibrahim, O. M. and Klein, S. A., "Absorption Power Cycles", Energy vol. 21. No. I, pp. 21-27, 1996.

Kanoğlu, Mehmet and çengel, Yunus A., "Economic Evaluation of Geothermal Power Generation, Heating, and Cooling", Energy 24 (1999) 501-509.

Kanoglu, Mehmet, "Exergy Analysis of a Dual-Level Binary Geothermal Power Plant", Geothermics 31 (2002) 709-724.

Köhler, Silke and Saadat, Ali, "Thermodynamic Modeling of Binary Cycles Looking for Best Case Scenarios", International Geothermal Conference, Reykjavik, Sep. 2003.

Shokouhmand H. and Atashkadi, P., "Performance Improvement of a Single, Flashing, Binary, Combined Cycle for Geothermal Powerplants", Energy vol. 22. No. 1, pp. 637-643. 1997.

Srinophakun, Thongchai, Laowithayangkul, Sangapong and Ishida, Masaru, "Simulation of Power Cycle with Energy Utilization Diagram", Energy Conversion and Management 42 (2001) 1437-1456.

Subbiah, S. and Natarajan, R. "Thermodynamic Analysis of Binary-Fluid Rankine Cycles for Geothermal Power Plants", Energy Convers. Mgmt vol. 28, No. I, pp. 47-52, 1988.

Wall, Göran, Chuang, Chia-Chin and Ishida, Masaru, "Exergy Study of the Kalina Cycle", paper presented at 1989 American Society of Mechanical Engineers (ASME), Winter Annual Meeting (WAM), San Francisco, California Dec. 10-15, 1989; published in R. A. Bajura, M. R. von Spakovsky and E. S. Geskin Eds., Analysis and Design of Energy Systems: Analysis of Industrial Processes, AES-vol. 10-3, pp. 73-77, ASME.

* cited by examiner

METHOD AND SYSTEM FOR GENERATING POWER FROM A HEAT SOURCE

FIELD OF THE INVENTION

The present invention relates to a method and system for generating power from a heat source, and in particular to a method and system for generating power from a geothermal heat source.

The invention has been developed primarily for use in generating power from a geothermal heat source and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of common general knowledge in the field.

Increased concern regarding the consumption of fossil fuels and reduction of greenhouse gases has led to research and development focusing on maximising the efficiency in power generation and on renewable energy resources. One renewable energy resource is geothermal energy, which is derived from the thermal energy stored deep within the Earth. Whilst increasing the efficiency of power generation is a common concern for all energy resources, it is of particular interest for geothermal power plants.

The production of power from geothermal energy basically involves extracting geothermal fluid from a reservoir and converting the thermal energy stored in the geothermal fluid into mechanical work and then into electricity. Conventional geothermal power cycles can generally be classified into non-condensing direct steam cycles, condensing direct steam cycles (single flash or double flash), binary cycles and combined cycles. All but condensing direct steam cycles use a working fluid to exchange heat with the geothermal heat source and drive the turbine to generate power. Condensing direct steam cycles are limited to dry-steam geothermal reservoirs, which are much rarer than other geothermal reservoirs, such as hot-water and hot-dry-rock reservoirs.

However, these conventional power cycles were originally designed for large scale power production from fossil fuels, where higher temperature sources are available for heat exchange. Consequently, in these conventional power cycles, the evaporation and condensation of the working fluid both occur at constant temperatures. In the context of geothermal sources, this results in large temperature mismatches between the working fluid and the geothermal heat source during the heat addition or the rejection processes in the thermodynamic cycle. For example, in a binary cycle, the temperature difference between the working and geothermal fluids in the primary heat exchanger could be as high as 80° C. to 100° C. In terms of thermodynamics, larger temperature differences in the heat exchange process increase the entropy in the power cycle, thereby reducing the efficiency, particularly the second law efficiencies related to exergy (availability), of the heat exchange process and resulting in poor energy recovery for power generation.

To address this problem, the Kalina cycle employs a multi-component zeotropic mixture of ammonia and water as its working fluid, and additional absorption and distillation equipment to reconstitute the mixture at the low temperature end of the cycle. The multi-component working fluid has a variable phase change temperature during evaporation so that the evaporation of the working fluid occurs over a range of temperatures. Hence, the mixture temperature can more closely match the temperature of the geothermal fluid to increase the amount of thermal energy that is recovered and minimising the entropy in the cycle, thus improving the efficiency of the heat exchange process for low temperature applications, such as geothermal heat sources, as opposed to fossil fuel based power generation.

A disadvantage of the Kalina cycle is that the absorption and distillation equipment added to the cycle creates further complexity to the system, and significantly increases the cost of plant installation compared with other types of power plants. Furthermore, the Kalina cycle has a high sensitivity towards the pressure and composition of the ammonia-water mixture, which limits the operation of the cycle over the whole range of possible geothermal reservoir temperatures and effectively sets a lower limit to the minimum temperature at which a deep geothermal energy source may be commercialised.

SUMMARY OF THE INVENTION

According to one aspect of the invention, there is provided a method of generating power from a heat source, said method including:

compressing a working fluid to increase its temperature;

exchanging heat between said working fluid and said heat source to superheat said working fluid;

expanding said superheated working fluid to drive a turbine, thereby reducing its temperature;

condensing said working fluid to further reduce its temperature; and returning said working fluid to said compressing step, the method further including the step of regenerating the heat of said working fluid, wherein working fluid passing between said compressing step and said heat exchanging step exchanges heat with working fluid passing between said expanding step and said condensing step, wherein said steps are performed in a thermodynamic cycle within a supercritical region above the saturation dome of said working fluid, and wherein said heat regenerating step is performed under isenthalpic conditions to induce continuous heat exchange.

According to another aspect of the invention, there is provided a system for generating power from a heat source, said system including:

a compressor for compressing a working fluid to increase its temperature;

a first heat exchanger fluidly connectable to said compressor and said heat source for exchanging heat between said working fluid and said heat source to superheat said working fluid;

a turbine fluidly connectable to said first heat exchanger for expanding said superheated working fluid, thereby reducing its temperature;

a second heat exchanger for condensing said working fluid to further reduce its temperature, said second heat exchanger being fluidly connectable to said turbine and said compressor, and a heat regenerator, said regenerator being fluidly interconnectable between said compressor and said first heat exchanger to pre-heat said working fluid prior to entering said first heat exchanger, and fluidly interconnectable between said turbine and said second heat exchanger to cool said working fluid after exiting said turbine, wherein working fluid passing between said compressor and said first heat exchanger exchanges heat with working fluid passing between said turbine and said condenser, wherein said system operates in a thermodynamic cycle within a supercritical region above the saturation dome of said working fluid, and wherein said regenerator operates under isenthalpic conditions to induce continuous heat exchange.

Preferably, the temperature in the heat regenerating step is controlled to maintain said isenthalpic conditions. Preferably, the heat regenerating step includes controlling the temperature of at least one of the working fluid passing between the compressing step and the heat exchanging step and the working fluid passing between the expanding step and the condensing step. Preferably, the temperature in said heat regenerating step is such that $$\frac{\Delta h}{\Delta T} \neq 0,$$

where $\Delta h$ is the difference in enthalpy between the working fluid passing between the compressing step and the heat exchanging step and the working fluid passing between the expanding step and the condensing step and $\Delta T$ is the difference in temperature between the working fluids.

Preferably, the method further includes the step of monitoring the temperature in said heat regenerating step. Preferably, the heat regenerating step includes controlling the pressure of at least one of the working fluid passing between the compressing step and the heat exchanging step and the working fluid passing between the expanding step and the condensing step, in response to said temperature monitoring step, thereby controlling the temperature of said at least one working fluid.

Preferably, the pressure in said heat regenerating step is controlled to maintain said isenthalpic conditions. Preferably, the heat regenerating step includes controlling the pressure of at least one of the working fluid passing between the compressing step and the heat exchanging step and the working fluid passing between the expanding step and the condensing step. Preferably, the heat regenerating step includes controlling the pressure of the working fluid passing between the compressing step and the heat exchanging step. Preferably, the heat regenerating step includes controlling the upstream pressure of said at least one working fluid to induce a change in the downstream temperature.

Preferably, the heat regenerator includes means for controlling the temperature within said heat regenerator to maintain said isenthalpic conditions. Preferably, the temperature controlling means controls the temperature of at least one of the working fluid passing between the compressor and the first heat exchanger and the working fluid passing between the turbine and the condenser. Preferably, the temperature in said heat regenerator is such that $$\frac{\Delta h}{\Delta T} \neq 0,$$

where $\Delta h$ is the difference in enthalpy between the working fluid passing between the compressor and the first heat exchanger and the working fluid passing between the turbine and the condenser and $\Delta T$ is the difference in temperature between the working fluids.

Preferably, the system includes means for monitoring the temperature within said regenerator. Preferably, the temperature monitoring means includes one or more thermocouples located within the regenerator. Preferably, the regenerator includes means for controlling the pressure of at least one of the working fluid passing between the compressor and the first heat exchanger and the working fluid passing between the turbine and the condenser in response to said temperature monitoring means, thereby controlling the temperature of said at least one working fluid.

Preferably, the system includes means for controlling the pressure within said regenerator to maintain said isenthalpic conditions. Preferably, the pressure controlling means controls the pressure of at least one of the working fluid passing between the compressor and the first heat exchanger and the working fluid passing between the turbine and the condenser. Preferably, the pressure controlling means controls the pressure of the working fluid passing between the compressor and the first heat exchanger. Preferably, the pressure controlling means controls the upstream pressure of said at least one working fluid to induce a change in the downstream temperature. Preferably, the pressure controlling means includes at least one or more valves for controlling the pressure of said at least one working fluid. Preferably, the valves are throttle valves.

Preferably, the operating pressure used in the method and of the system is more than the critical point of the working fluid. Preferably, the operating pressure is less than 30 MPa. It is preferred that the operating pressure is less than 15 MPa. Preferably, the operating pressure is between 8 and 12 MPa. Preferably, the operating temperature used in the method and the system is between 100° C. and 200° C.

Preferably, the working fluid has a critical pressure of between 3.3 MPa and 7.5 MPa. Preferably, the working fluid has a critical temperature of between 30° C. to 200° C.

It is preferred that the working fluid is composed of a single component. Alternatively, a multi-component working fluid can be used if desired.

Preferably, the working fluid includes carbon dioxide, n-Pentane ($C_5H_{12}$), HFC-245ca ($CF_2H$—$CF_2$—$CFH_2$), HFC-245fa ($CF_3$—$CH_2$—$CF_2H$), HFC-134a ($CH_2F$—$CF_3$), refrigerant 125 and pentafluoroethane ($F_4CH_2F$).

Preferably, the heat source includes a geothermal heat source or a waste heat source. Preferably, the geothermal heat source includes a hot-dry-rock reservoir or a hot-water reservoir. Alternatively, the waste heat source includes cooling water or waste steam from a conventional power station, including a coal, peat, oil, gas or other fossil fuel fired power station.

BRIEF DESCRIPTION OF THE DRAWINGS

Preferred embodiments of the invention will now be described, by way of example only, with reference to the accompanying drawings, in which.

PREFERRED EMBODIMENTS OF THE INVENTION

Figure 1:
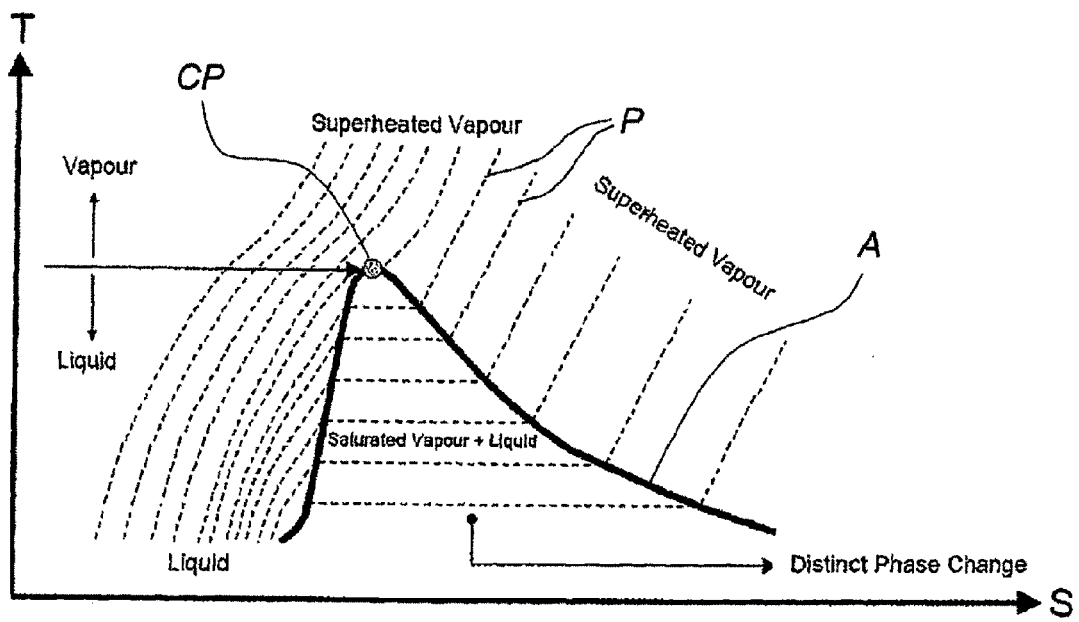
FIG. 1 is a temperature-entropy phase diagram of a working fluid.
Figure 2:
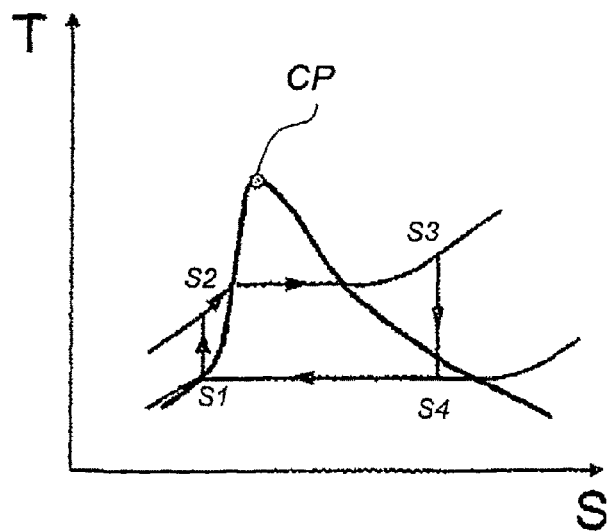
FIG. 2 is a temperature-entropy phase diagram illustrating a Rankine cycle.

FIG. 1 is a phase diagram of a pure working fluid in the temperature (T)-entropy (S) domain. In the diagram, dotted lines P are isobars representing constant pressure. The saturation dome A defines the boundary at which the working fluid is in a saturated state. Most conventional power cycles, such as the Rankine cycle shown in FIG. 2, operate in or around the saturation phase of the working fluid as defined by the saturation dome A so that any phase change associated with the cycle takes place under constant pressure and temperature. This means that energy from the heat source is lost during phase changes of the working fluid within the saturation dome A. By contrast, the embodiments of the invention avoid these heat losses by operating above the saturation dome A.

Figure 3:
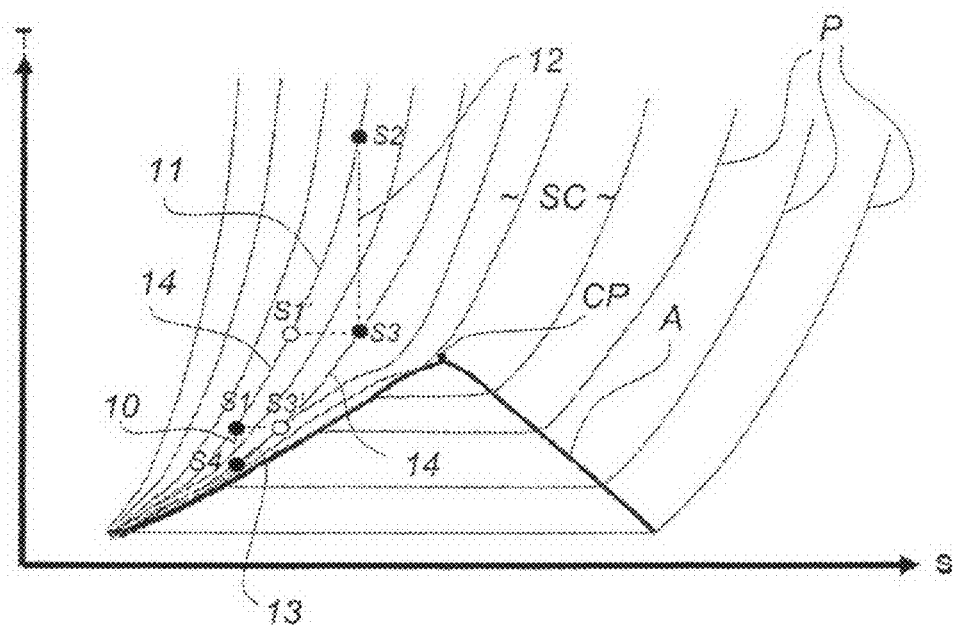
FIG. 3 is a temperature-entropy phase diagram illustrating a method according a first embodiment of the invention.
Figure 4:
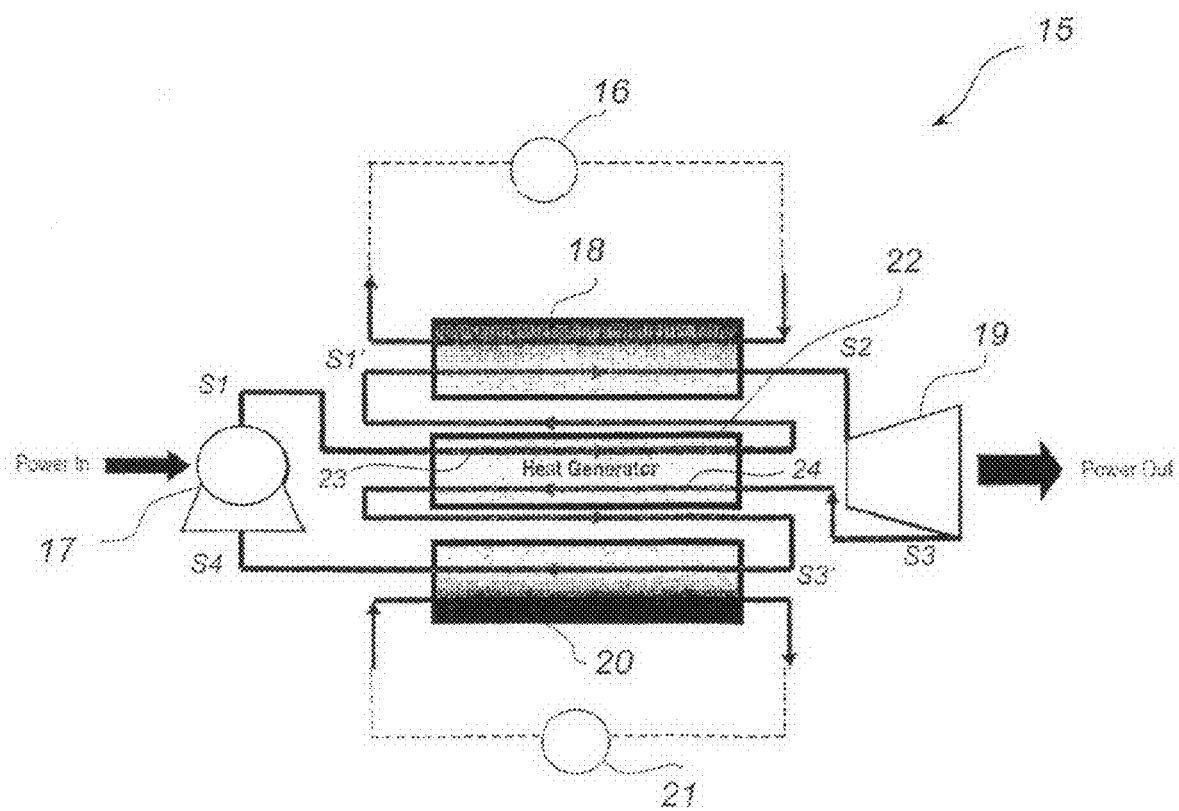
FIG. 4 is a schematic drawing of a system according to the first embodiment.

Referring to FIGS. 3 and 4, one embodiment of the invention is illustrated. As best shown in FIG. 3, the method of generating power from a heat source includes the step 10 of compressing a working fluid to increase its temperature (states S4-S1) and the step 11 of exchanging heat between the working fluid and the heat source to superheat the working fluid (states S1'-S2). At step 12, the superheated working fluid is expanded to drive a turbine, thereby reducing its temperature (states S2-S3). Then at step 13, the working fluid is condensed to further reduce its temperature (states S3'-S4) before being returned to the compressing step 10. The method further includes a heat regenerating step 14 wherein working fluid passing between the compressing step 10 and the heat exchanging step 11 (states S1-S1') exchanges heat with the working fluid passing between the expanding step 12 and the condensing step 13 (states S3-S3'). Thus, in effect the working fluid is pre-heated after the compressing step 10 and prior to exchanging heat with the heat source at step 11, and the working fluid is cooled after the expansion step 12 prior to the condensing step 13. These steps 10 to 14 are performed in a thermodynamic cycle (S1-S1'-S2-S3-S3'-S4) within the supercritical region SC above the saturation dome A of the working fluid, and the heat regenerating step 14 is performed under isenthalpic conditions to induce continuous heat exchange.

The method illustrated in FIG. 3 can be implemented in a system 15 for generating power from a heat source 16, as best shown in FIG. 4. The system includes a compressor 17 in the form of a feed pump for compressing a working fluid to increase its temperature, and a first heat exchanger 18 in the form of a high temperature heat exchanger that is fluidly connectable to the compressor 17 and the heat source 16 for exchanging heat between the working fluid and the heat source 16 to superheat the working fluid. A turbine 19 is fluidly connectable to the high temperature heat exchanger 18 for expanding the superheated working fluid, thereby reducing its temperature. A second heat exchanger 20 in the form of a low temperature heat exchanger is fluidly connectable to the turbine 19 and the compressor 17 for condensing the working fluid to further reduce its temperature using a cooler fluid obtained from a suitable cool fluid reservoir 21. A heat regenerator 22 is fluidly interconnectable between the compressor 17 and the first heat exchanger 18 to pre-heat the working fluid prior to entering the high temperature heat exchanger, and fluidly interconnectable between the turbine 19 and the low temperature heat exchanger 20 to cool the working fluid after exiting the turbine 19. The heat regenerator 22 uses the "hot" working fluid passing between the turbine 19 and the condenser 20 (stream 24) to pre-heat the "cool" working fluid passing between the compressor 16 and the high temperature heat exchanger 18 (stream 23). The system 15 operates in a thermodynamic cycle (S1-S1'-S2-S3-S3'-S4) within a supercritical region SC above the saturation dome A of the working fluid, and the regenerator 22 operates under isenthalpic conditions to induce continuous heat exchange.

The thermodynamic cycle (S1-S1'-S2-S3-S3'-S4) is substantially similar to a Rankine cycle, although it is elevated into the supercritical region SC above the saturation dome A of the working fluid and the states S1-S1' and S3-S3' are under isenthalpic conditions.

By conducting the entire thermodynamic cycle (S1-S1'-S2-S3-S3'-S4) within the supercritical region SC above the saturation dome A, this fully supercritical process reduces efficiency losses associated with the high temperature heat exchanger 18 and the low temperature heat exchanger 20. That is, in states S1-S1'-S2 and S3-S3'-S4, the working fluid is superheated and condensed at variable temperatures rather than at a constant temperature, as in conventional power cycles. This minimises the temperature mismatch between the geothermal fluid and the working fluid and between the cool fluid and the working fluid. Thus, the entropy in the thermodynamic cycle (S1-S1'-S2-S3-S3'-S4) is reduced, and the efficiency of energy conversion is increased.

In addition, the heat regenerator 22 thus reduces the amount of energy required for the heat addition process performed by the compressor 17, thereby improving the efficiency of the thermodynamic cycle (S1-S1'-S2-S3-S3'-S4) within the supercritical region SC above the saturation dome A of the working fluid.

Furthermore, because the heat regenerating step 14 is performed under isenthalpic conditions, there is always a temperature gradient to act as a driving force for continuous heat exchange between the parallel streams 23 and 24 of the working fluids within the regenerator 22.

Figure 5:
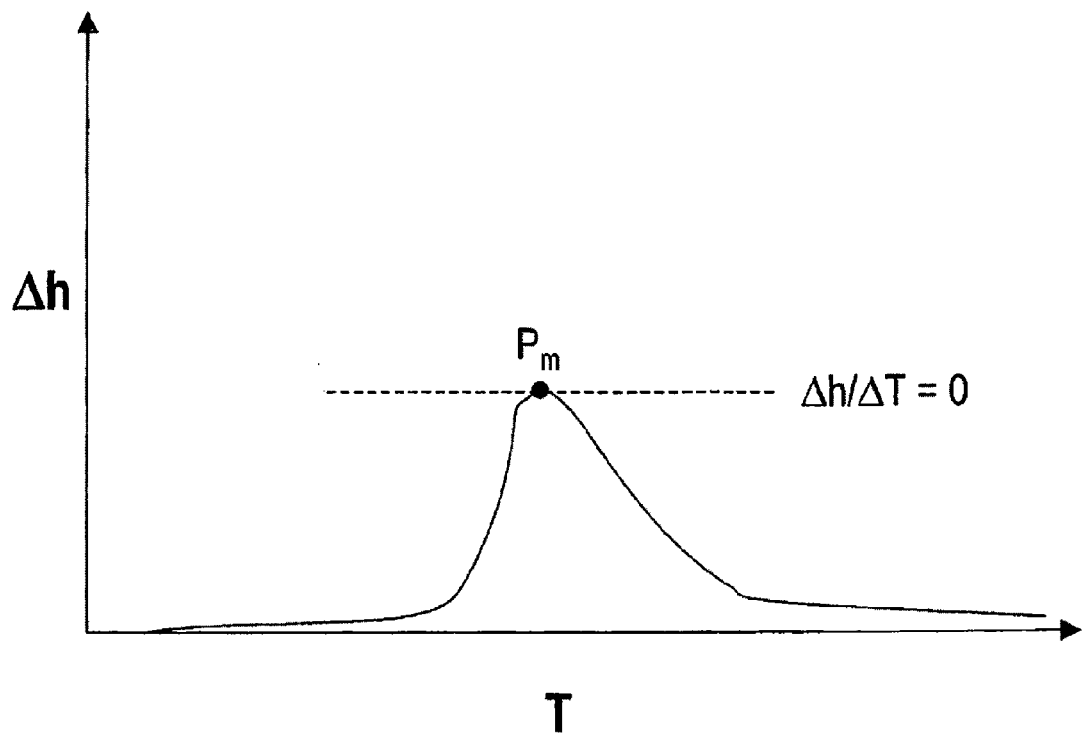
FIG. 5 is a graph illustrating the change in enthalpy against the temperature for a pure working fluid.

The importance of performing the regenerating step under isenthalpic conditions is better illustrated in FIG. 5, which shows a plot of the enthalpy difference of the "cold" and "hot" working fluid streams ($\Delta h$) as a function of temperature (T) for a pure substance as a working fluid, such as carbon dioxide, under supercritical conditions SC. The resulting curve shows a maximum $P_m$, at which $$\frac{\Delta h}{\Delta T} = 0,$$

where there is no temperature gradient to drive the heat exchange process. Consequently, the existence of a maximum point $P_m$ for $\Delta h$ is a detriment to the thermodynamic cycle efficiency, since it prevents continual heat exchange and thus reduces the efficiency of energy conversion.

By contrast, in the preferred embodiment, the temperature is controlled so that the enthalpy in the heat regenerating step is kept constant; i.e. under isenthalpic conditions, and the temperature is such that $$\frac{\Delta h}{\Delta T} \neq 0,$$

ensuring that a temperature gradient exists throughout the whole heat regenerating step 14, resulting in the continuation of the heat exchange process between the "cold" and "hot" working fluid streams 23 and 24 passing through the heat regenerator 22.

Moreover, the improved efficiency derived from method and system 15 is optimised by operating at pressures above the critical point of the working fluid. Consequently, by selecting the appropriate type of working fluid, the system 15 can operate within a desired pressure range to meet any constraints in operational costs or safety requirements. In this context, the operating pressure used in the method and the system is preferably less than 15 MPa, even though operating pressures can be up to 30 MPa. In particular, it has been found that operating pressures between 8 and 12 MPa allows for a greater selection of suitable working fluids. Working in these preferred operational pressures permits application of the embodiments of the invention to greater ranges of temperatures, generally between 100° C. and 200° C.

Examples of high temperature heat exchangers include boilers and vapour generators. Suitable low temperature heat exchangers air-cooled or water-cooled condensers.

It is contemplated that this embodiment of the invention is applicable to most heat sources, and in particular may be used a part of a "bottoming" cycle utilising the waste heat from a conventional coal fired power station, or other fossil fuel based power stations, such as peat, oil and gas based power stations.

Figure 6:
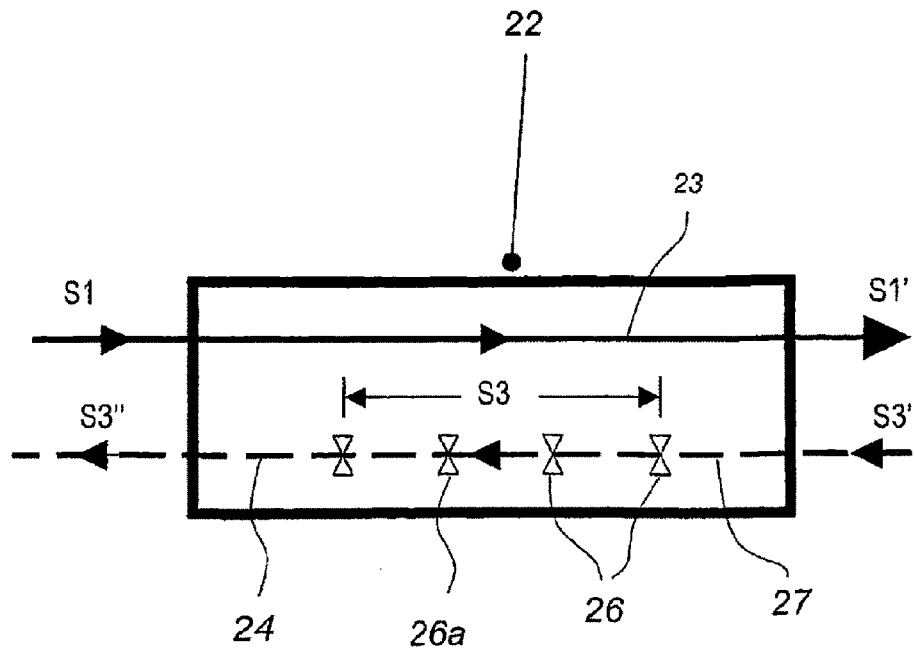
FIG. 6 is a schematic drawing of a regenerator for a system according to a second embodiment of the invention.
Figure 7:
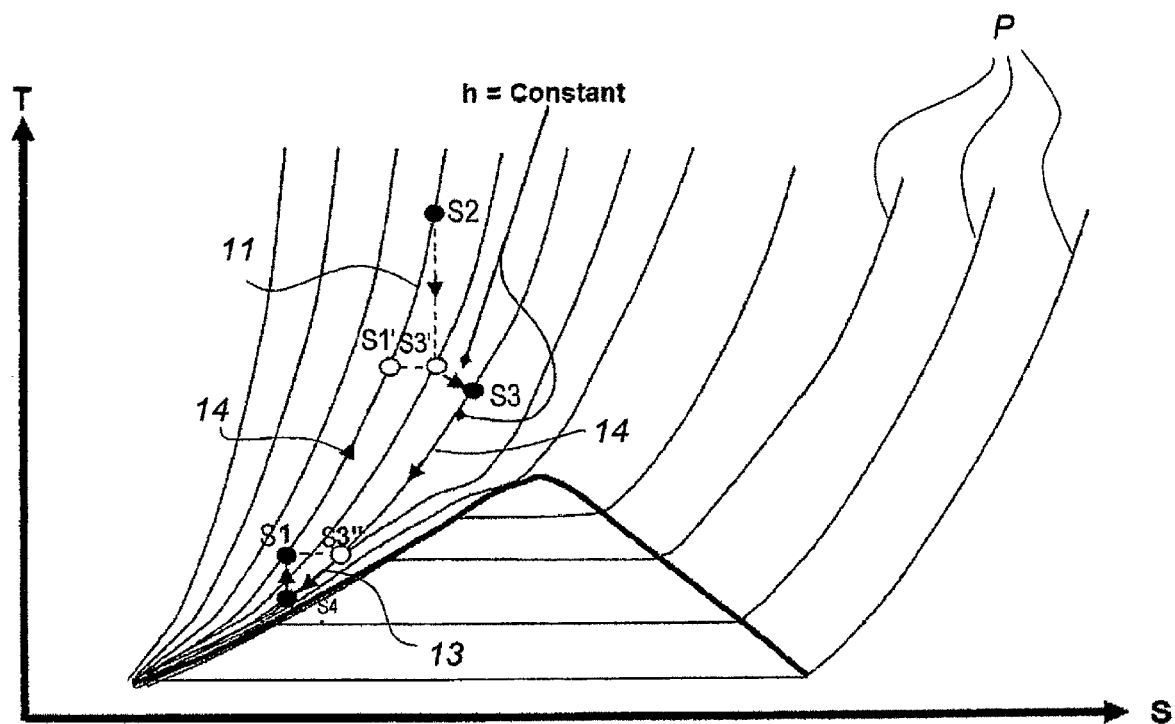
FIG. 7 is a temperature-entropy phase diagram illustrating a method according to the second embodiment.

A particularly preferred embodiment of the invention for geothermal heat sources is illustrated in FIGS. 6 and 7, where corresponding features have been given the same reference numerals. This embodiment takes into account that for geothermal heat sources, the close proximity of the constant pressure lines P in the supercritical region SC may result in small net power outputs, and the maximum cycle temperatures are relatively low compared with other heat sources. In particular, whilst the embodiment has all the features of the system 15 shown in FIG. 4, the heat regenerator 22 has a temperature monitoring system (not shown). The temperature monitoring system includes a plurality of thermocouples located at various positions within the regenerator 22, which are operatively connected to a central processing unit (CPU). The regenerator 22 also includes a plurality of throttle valves 26 provided on the piping 27 of the "hot" working fluid stream 24 between the turbine 19 and the condenser 20, as best shown in FIG. 6. The throttle valves are operatively connected to the CPU.

As shown in FIG. 7, the thermodynamic cycle according to this method can be described in terms of the transition between states of the working fluid as follows:

| States S1-S1' | Heat recovery at constant enthalpy in the heat regenerator 22 |
| States S1'-S2 | Heat addition at constant pressure in the high temperature heat exchanger 18 |
| States S2-S3' | Expansion in the turbine 19 for work output |
| States S3'-S3 | Heat recovery at constant enthalpy in the heat regenerator 22 |
| States S3-S3" | Heat recovery at constant enthalpy in the heat regenerator 22 |
| States S3"-S4 | Heat rejection at constant pressure in the low temperature heat exchanger 20 |
| States S4-S1 | Pressure lift of the condensed working fluid in liquid form by the feed pump 17 |

Operation of the system 15 according to this embodiment will now be described in detail with reference to FIGS. 4 and 6. The working fluid, in the form of $CO_2$ in this example, enters the feed pump 17 at state S4 as saturated (or mildly compressed) liquid and is compressed to the operating pressure of the high temperature heat exchanger 18. The temperature of the $CO_2$ working fluid increases somewhat during this compression process due to slight changes in its specific volume.

The $CO_2$ working fluid then enters the heat regenerator 22, which generally operates at the same pressure as the high temperature heat exchanger 18, as a compressed liquid at state S1 and leaves as a heated vapour phase at state S1'. This is a heat recovery process for which the required thermal energy is supplied by the hot $CO_2$ working fluid leaving the turbine at state S3', slightly above the minimum cycle pressure, and which is subjected to variations in pressure to maintain isenthalpic conditions in the regenerator 22.

Next, the vapour at state S1' enters the high temperature heat exchanger 18 in which its temperature is further increased or superheated such that the $CO_2$ working fluid becomes a superheated vapour upon exit at state S2. The necessary heat for raising the temperature of the working fluid between states S1' and S2 is supplied by a hot geothermal fluid from a suitable geothermal heat source 16.

The superheated vapour at state S2 then enters the turbine 19 where it expands and produces electricity by rotating the shaft of an electric generator (not shown). During the expansion process, the pressure and temperature of the $CO_2$ working fluid drops until it reaches state S3'. In this state, the $CO_2$ working fluid still has considerable thermal energy, which is further exploited by passing it through the heat regenerator 22 to heat up the "cold" $CO_2$ working fluid entering the heat regenerator 22 at state S1. As a result of the heat exchange in the heat regenerator 22 between the relative hot and cold $CO_2$ working fluids, the temperature of the hot $CO_2$ working fluid drops to that of state S3" and the temperature of the cold $CO_2$ working fluid increases to that of state S1'.

In the regenerator 22, the throttle valves 26 are initially fully open and the hot $CO_2$ stream 24 exchanges heat with the cold $CO_2$ stream 23. When the temperature monitoring system, for example using one or more thermocouples, identifies that the temperature of a particular area in the regenerator 22 is approaching the value at which $$\frac{\Delta h}{\Delta T} = 0,$$

the CPU sends a signal to the closest upstream throttle valve, for example valve 26a. In response, the throttle valve 26a is partly closed so that the resulting pressure drop throttles the "hot" working fluid stream 24 into a lower pressure, thus ensuring that the heat regenerator 22 remains in constant enthalpy (states S3'-S3 and S3-S3") so that $$\frac{\Delta h}{\Delta T} \neq 0,$$

and the heat exchange process is continual in the regenerator 22. This adjustment of the localised pressure within the regenerator 22 may be repeated several times, depending on the operating conditions, until the "hot" working fluid stream 24 leaves the regenerator 22 at the minimum cycle pressure in the state S3". During this transition from state S3', at the entry into the regenerator 22, to the state S3", at the exit from the regenerator 22, the working fluid passes through state S3.

The $CO_2$ working fluid exiting the hot side of the heat regenerator 22 in state S3" is then condensed at a constant pressure in the low temperature heat exchanger 20 by rejecting heat to a cooling medium from the cool medium reservoir 21. The condensed $CO_2$ working fluid finally leaves the low temperature heat exchanger 20 and enters the feed pump 17 to complete the cycle.

Although this embodiment has been described as being particularly applicable to geothermal heat sources, it may also be used for bottoming cycles, where the heat source is the working fluid of the main power cycle. For example, the low temperature steam exiting the main cycle turbine in coal fired power plants.

Whilst in the embodiments of the invention, carbon dioxide has been used as the working fluid, other working fluids can be selected, including, n-Pentane ($C_5H_{12}$), HFC-245ca ($CF_2H-CF_2-CFH_2$), HFC-245fa ($CF_3-CH_2-CF_2H$), HFC-134a ($CH_2F-CF_3$), refrigerant 125 and pentafluoroethane ($F_4CH_2F$). The comparative properties of each working fluid are set out in Table 1 below.

TABLE 1

Properties of Working Fluids suitable for the invention.

| Working Fluid | Critical Pressure | Critical Temperature | Safety | Ozone Depletion Potential |
|---|---|---|---|---|
| Carbon Dioxide ($CO_2$) | 7.38 MPa | 30.9° C. | Non-flammable | ≈0 |
| n-Pentane ($C_5H_{12}$) | 3.37 MPa | 196.6° C. | Flammable | ≈0 |
| HFC-245ca ($CF_2H-CF_2CFH_2$) | 3.86 MPa | 178.5° C. | Non-flammable | ≈0 |
| HFC-245fa ($CF_3-CH_2-CF_2H$) | 3.64 MPa | 157.6° C. | Non-flammable | ≈0 |
| HFC-134a ($CH_2F-CF_3$) | 4.1 MPa | 101.2° C. | Non-flammable | ≈0 |
| Refrigerant-125 or Pentafluoroethane ($F_4H-CH_2F$) | 3.7 MPa | 66.8° C. | Non-flammable | ≈0 |

It has been found that other suitable working fluids can be used with critical pressures of between 3.3 MPa and 7.5 MPa, and a critical temperatures of between 30° C. to 200° C. Moreover, in other embodiments of the invention a multi-component working fluid is employed in the method and system, instead of a working fluid composed of a single component.

The thermal conversion efficiency and exergetic efficiency of the second embodiment of FIGS. 6 and 7 were calculated as a function of the temperature difference between the geothermal fluid at the production and reject wells, $\Delta T_{geo}$. The thermal conversion efficiency and exergetic efficiency of the preferred embodiment was compared with thermal conversion efficiency and exergetic efficiency of conventional power cycles. The working fluid chosen for the second embodiment was carbon dioxide.

Figure 8:
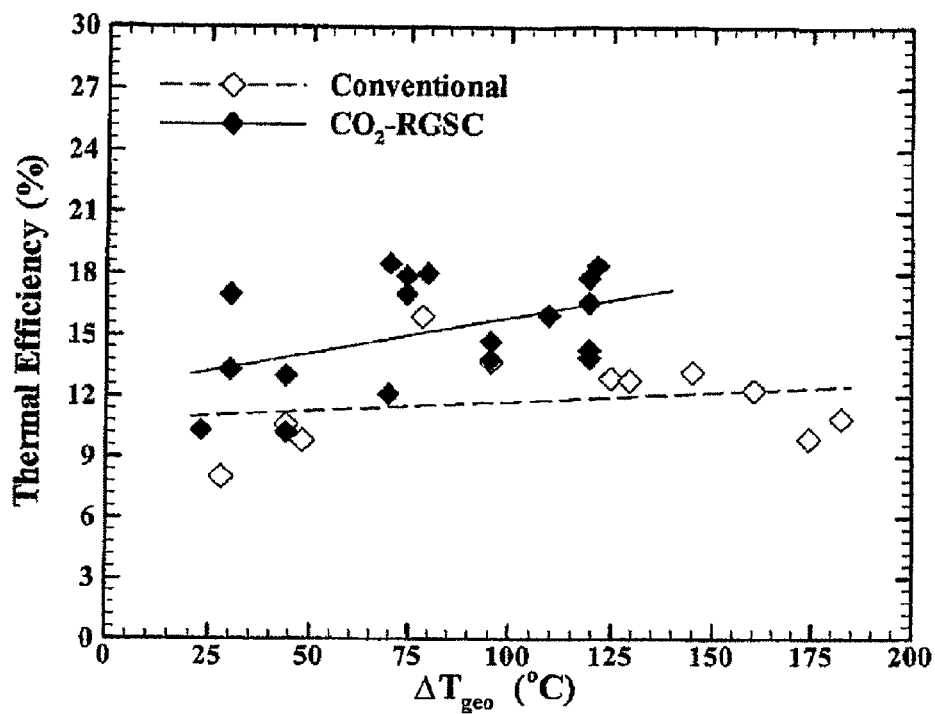
FIG. 8 is a graph illustrating comparing the thermal conversion efficiency of the second embodiment with a conventional power cycle.
Figure 9:
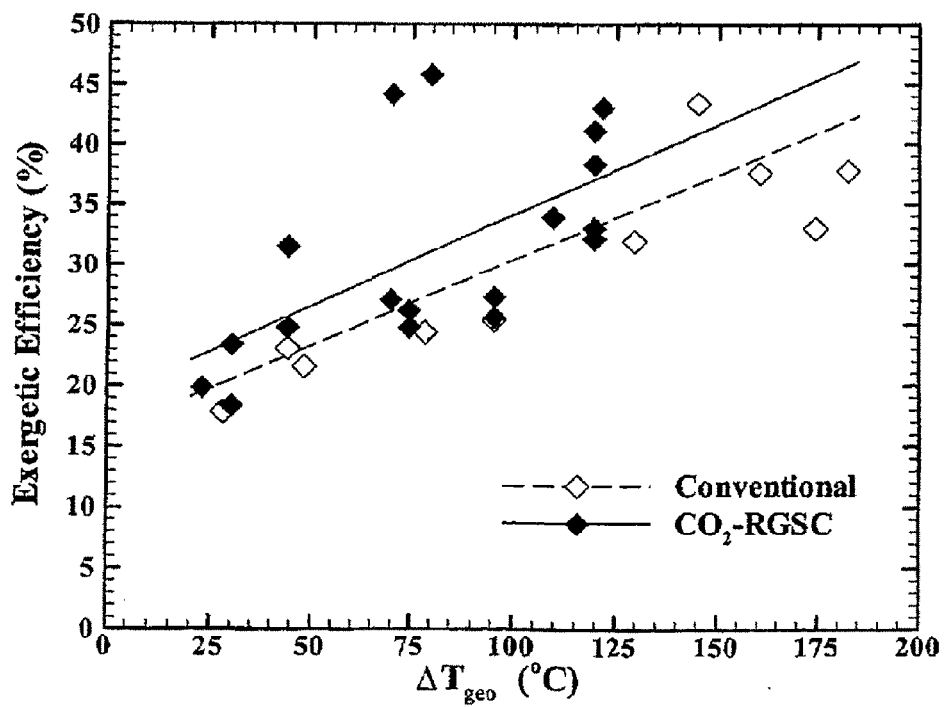
FIG. 9 is a graph illustrating comparing the exergetic efficiency of the second embodiment with a conventional power cycle.

As best shown in FIG. 8, the thermal conversion efficiency of the second embodiment (designated as $CO_2$—RGSC) was higher than the thermal conversion efficiency of conventional power cycles. For the second embodiment, the thermal conversion efficiency ranges from 10% to 18% with an average of 16.5%. By contrast, for conventional power cycles, including the Kalina cycle, the thermal conversion efficiency does not change and plateaus around a nominal value between 11% and 12%. Likewise, the exergetic efficiency of the embodiment was higher than the exergetic efficiency of the conventional power cycles as $\Delta T_{geo}$ increases, as best shown in FIG. 9. Thus, FIGS. 8 and 9 indicate that the thermal conversion and exergetic efficiencies of the embodiment are far superior to that of thermal conversion and exergetic efficiencies of conventional power cycles.

Figure 10:
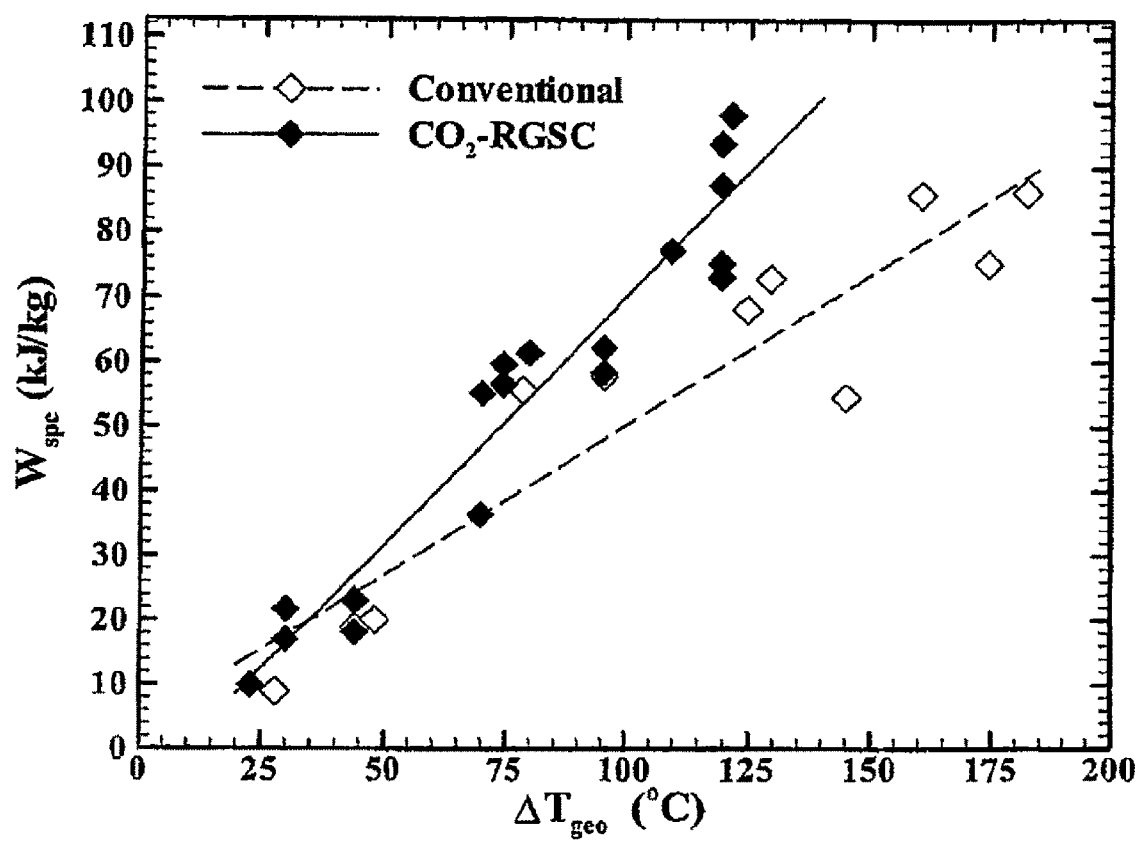
FIG. 10 is graph illustrating comparing the specific work obtained by the second embodiment with a conventional power cycle.

These improved thermal conversion and exergetic efficiencies imply that more power can be generated from this embodiment per unit of input energy than from a conventional power cycle. This is illustrated in FIG. 10, which shows a graph of the specific power ($W_{spc}$) against $\Delta T_{geo}$. The amount of work extracted from the geothermal fluid, and hence the amount of power generated, was substantially higher for the embodiment than the conventional power cycles, especially as $\Delta T_{geo}$ increases.

Thus, the embodiments of the invention provide a method and system of generating power from a heat source, including a geothermal heat source, with improved efficiency over conventional power cycles and without requiring additional equipment that would add to the complexity of the system or cost of installation. Alternatively or additionally, the invention provides a method to extract more heat economically at a lower temperature than for conventional technologies, thus expanding the number of potential heat sources that may be exploited commercially.

In other embodiments, the temperature in the regenerating step is directly controlled, instead of controlling the pressure of the working fluid. In one embodiment, the temperature or pressure of the working fluid passing between the expanding step and the condensing step (or the working fluid between the turbine and the condenser) is controlled to maintain isenthalpic conditions.

Although the invention has been described with reference to specific examples, it will be appreciated by those skilled in the art that the invention may be embodied in many other forms.

The invention claimed is:

1. A method of generating power from a heat source, said method comprising:
   compressing a working fluid to increase its temperature;
   exchanging heat between said working fluid and said heat source to superheat said working fluid;
   expanding said superheated working fluid to drive a turbine, thereby reducing its temperature;
   condensing said working fluid to further reduce its temperature; and
   returning said working fluid to said compressing step,
   the method further comprising the step of regenerating the heat of said working fluid wherein working fluid passing between said compressing step and said heat exchanging step exchanges heat with working fluid passing between said expanding step and said condensing step;
   wherein said steps are performed in a thermodynamic cycle within a supercritical region above the saturation dome of said working fluid, and wherein said heat regenerating step is performed under isenthalpic conditions to induce continuous heat exchange.

2. The method of claim 1, wherein the temperature in said heat regenerating step is controlled to maintain said isenthalpic conditions.

3. The method of claim 2, wherein the heat regenerating step comprises controlling the temperature of at least one of the working fluid passing between the compressing step and the heat exchanging step and the working fluid passing between the expanding step and the condensing step.

4. The method of claim 1, wherein the temperature in said heat regenerating step is such that $$\frac{\Delta h}{\Delta T} \neq 0,$$

where Δh is the difference in enthalpy between the working fluid passing between the compressing step and the heat exchanging step and the working fluid passing between the expanding step and the condensing step and ΔT is the difference in temperature between the working fluids.

5. The method of claim 1, further comprising the step of monitoring the temperature in said heat regenerating step.

6. The method of claim 5, wherein the heat regenerating step comprises controlling the pressure of at least one of the working fluid passing between the compressing step and the heat exchanging step and the working fluid passing between the expanding step and the condensing step, in response to said temperature monitoring step, thereby controlling the temperature of said at least one working fluid.

7. The method of claim 1, wherein the pressure in the heat regenerating step is controlled to maintain said isenthalpic conditions.

8. The method of claim 7, wherein the heat regenerating step comprises controlling the pressure of at least one of the working fluid passing between the compressing step and the heat exchanging step and the working fluid passing between the expanding step and the condensing step.

9. The method of claim 6, wherein the heat regenerating step comprises controlling the pressure of the working fluid passing between the compressing step and the heat exchanging step.

10. The method of claim 1, wherein the operating pressure is more than the critical point of the working fluid.

11. The method of claim 10, wherein the operating pressure is less than 30 MPa.

12. The method of claim 11, wherein the operating pressure is less than 15 MPa.

13. The method of claim 12, wherein the operating pressure is between 8 and 12 MPa.

14. The method of claim 1, wherein the operating temperature is between 100° C. and 200° C.

15. The method of claim 1, wherein the working fluid has a critical pressure of between 3.3 MPa and 7.5 MPa.

16. The method of claim 1, wherein the working fluid has a critical temperature of between 30° C. to 200° C.

17. The method of claim 1, wherein the working fluid is composed of a single component.

18. The method of claim 17, wherein the working fluid is selected from the group consisting of carbon dioxide, n-Pentane ($C_5H_{12}$), HFC-245ca ($CF_2H$—$CF_2$—$CFH_2$), HFC-245fa ($CF_3$—$CH_2$—$CF_2H$), HFC-134a ($CH_2F$—$CF_3$), refrigerant 125 and pentafluoroethane ($F_4CH_2F$).

19. The method of claim 1, wherein the working fluid is a multi-component working fluid.

20. The method of claim 1, wherein the heat source comprises a geothermal heat source or a waste heat source.

21. The method of claim 20, wherein the geothermal heat source comprises a hot-dry-rock reservoir or a hot-water reservoir.

22. The method of claim 20, wherein the waste heat source includes cooling water or waste steam from a conventional power station.

23. The method of claim 22, wherein the conventional power station comprises a coal, peat, oil, gas or other fossil fuel fired power station.

24. A system for generating power from a heat source, said system comprising:
 a compressor for compressing a working fluid to increase its temperature;
 a first heat exchanger fluidly connectable to said compressor and said heat source for exchanging heat between said working fluid and said heat source to superheat said working fluid;
 a turbine fluidly connectable to said first heat exchanger for expanding said superheated working fluid, thereby reducing its temperature;
 a second heat exchanger for condensing said working fluid to further reduce its temperature, said second heat exchanger being fluidly connectable to said turbine and said compressor, and
 a heat regenerator, said regenerator being fluidly interconnectable between said compressor and said first heat exchanger to pre-heat said working fluid prior to entering said first heat exchanger, and fluidly interconnectable between said turbine and said second heat exchanger to cool said working fluid after exiting said turbine, wherein said working fluid passing between said compressor and said first heat exchanger exchanges heat with said working fluid passing between said turbine and said condenser,
 wherein said system operates in a thermodynamic cycle within a supercritical region above the saturation dome of said working fluid, and wherein said regenerator operates under isenthalpic conditions to induce continuous heat exchange.

25. The system of claim 24, wherein the heat regenerator comprises means for controlling the temperature within said heat regenerator to maintain said isenthalpic conditions.

26. The system of claim 25, wherein the temperature controlling means controls the temperature of at least one of the working fluid passing between the compressor and the first heat exchanger and the working fluid passing between the turbine and the condenser.

27. The system of claim 24, wherein the temperature in said heat regenerator is such that $$\frac{\Delta h}{\Delta T} \neq 0,$$

where Δh is the difference in enthalpy between the working fluid passing between the compressor and the first heat exchanger and the working fluid passing between the turbine and the condenser and ΔT is the difference in temperature between the working fluids.

28. The system of claim 24, further comprising means for monitoring the temperature within said regenerator.

29. The system of claim 28, wherein the temperature monitoring means comprises one or more thermocouples located within the regenerator.

30. The system of claim 28, wherein the regenerator comprises means for controlling the pressure of at least one of the working fluid passing between the compressor and the first heat exchanger and the working fluid passing between the turbine and the condenser in response to said temperature monitoring means, thereby controlling the temperature of said at least one working fluid.

31. The system of claim 24, wherein the heat regenerator comprises means for controlling the pressure within said heat regenerator to maintain said isenthalpic conditions.

32. The system of claim 31, wherein the pressure controlling means controls the pressure of at least one of the working fluid passing between the compressor and the first heat exchanger and the working fluid passing between the turbine and the condenser.

33. The system of claim 30, wherein the pressure controlling means controls the pressure of the working fluid passing between the compressor and the first heat exchanger.

34. The system of claim 30, wherein the pressure controlling means controls the upstream pressure of said at least one working fluid to induce a change in the downstream temperature.

35. The system of claim 30, wherein the pressure controlling means comprises at least one or more valves for controlling the pressure of said at least one working fluid.

36. The system of claim 35, wherein the valves are throttle valves.

37. The system of claim 24, wherein the operating pressure is more than the critical point of the working fluid.

38. The system of claim 37, wherein the operating pressure is less than 30 MPa.

39. The system of claim 38, wherein the operating pressure is less than 15 MPa.

40. The system of claim 39, wherein the operating pressure is between 8 and 12 MPa.

41. The system of claim 24, wherein the operating temperature is between 100° C. and 200° C.

42. The system of claim 24, wherein the working fluid has a critical pressure of between 3.3 MPa and 7.5 MPa.

43. The system of claim 24, wherein the working fluid has a critical temperature of between 30° C. to 200° C.

44. The system of claim 24, wherein the working fluid is composed of a single component.

45. The system of claim 44, wherein the working fluid is selecting from the group consisting of carbon dioxide, n-Pentane ($C_5H_{12}$), HFC-245ca ($CF_2H-CF_2-CFH_2$), HFC-245fa ($CF_3-CH_2-CF_2H$), HFC-134a ($CH_2F-CF_3$), refrigerant 125 and pentafluoroethane ($F_4CH_2F$).

46. The system of claim 24, wherein the working fluid is a multi-component working fluid.

47. The system of claim 24, wherein the heat source comprises a geothermal heat source or a waste heat source.

48. The system of claim 47, wherein the geothermal heat source comprises a hot-dry-rock reservoir or a hot-water reservoir.

49. The system of claim 47, wherein the waste heat source comprises cooling water or waste steam from a conventional power station.

50. The system of claim 49, wherein the conventional power station comprises a coal, peat, oil, gas or other fossil fuel fired power station.

* * * * *